US006433539B2

United States Patent
Gaessler et al.

(10) Patent No.: US 6,433,539 B2
(45) Date of Patent: Aug. 13, 2002

(54) INCREMENT TRANSDUCER AND ABSOLUTE ANGLE TRANSDUCER MEANS FOR REDUNDANT RELIABLE ANGULAR POSITION DETECTION AND DETECTION METHOD USING SAME

(75) Inventors: Hermann Gaessler, Vaihingen; Udo Diehl, Stuttgart; Karsten Mischker, Leonberg; Rainer Walter, Pleidelsheim; Bernd Rosenau, Tamm; Juergen Schiemann, Markgroeningen; Christian Grosse, Kornwestheim; Georg Mallebrein, Korntal-Muenchingen; Volker Beuche, Stuttgart; Stefan Reimer, Markgroeningen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/740,468

(22) Filed: Dec. 19, 2000

(30) Foreign Application Priority Data

Dec. 22, 1999 (DE) .......................................... 199 62 153

(51) Int. Cl.⁷ .................................................. G01B 7/30
(52) U.S. Cl. .................................. 324/207.25; 324/174
(58) Field of Search .......................... 324/207.2, 207.25, 324/207.21, 207.12, 173, 174, 207.23; 336/32 R, 32 M

(56) References Cited

U.S. PATENT DOCUMENTS 4,392,375 A * 7/1983 Eguchi et al. ............. 73/118.1
5,055,781 A * 10/1991 Sakakibara et al. ..... 324/207.21

* cited by examiner

*Primary Examiner*—Edward Lefkowitz
*Assistant Examiner*—Subhash Zaveri
(74) *Attorney, Agent, or Firm*—Michael J. Striker

(57) ABSTRACT

The angular position detection device for the angular position of a rotatable part includes a transducer wheel rigidly connected with the rotatable part, an increment transducer and an absolute angle transducer arranged for simultaneous detection of the angular position of the transducer wheel and a control device including a computing unit and a monitoring module. Signals from both transducers that are characteristic of the rotational position of the transducer wheel are simultaneously fed to both the computing unit and the monitoring module. A redundant method of reliably ascertaining the rotational position of the rotatable part without periodic resynchronization of the increment transducer is also described.

10 Claims, 2 Drawing Sheets

INCREMENT TRANSDUCER AND ABSOLUTE ANGLE TRANSDUCER MEANS FOR REDUNDANT RELIABLE ANGULAR POSITION DETECTION AND DETECTION METHOD USING SAME

BACKGROUND OF THE INVENTION

The present invention relates to a method of and a device for detecting an angular position of a rotatable machine part, for example a rotary position of a crankshaft of an internal combustion engine. From the detection of the corresponding actual angular position of the crankshaft, signals are produced which can be used for generation of an ejection or an ignition pulse.

Methods of and devices of the above mentioned general type are known in the art. The position of the crank shaft is determined by counting of the incremental teeth on a transducer wheel of a crankshaft. A rotary angle transducer is necessary for accurate association of the crankshaft position. This can be an inductive pulse transducer which supplies an output signal to a control device when a reference mark, for example designed as a pin, a hole or a recess, passes by the sensor. One output signal can be produced per one revolution of the crankshaft.

The teeth of a special tooth wheel on the crankshaft can be scanned by an inductive pulse transducer. Thereby a change of the magnetic flux can be obtained, which induces an alternating voltage. This alternating voltage can be evaluated by means of a control device.

When the individual teeth are arranged on the tooth wheel at equidistant spaces from one another, two teeth on the toothed wheel are removed for defining a reference position, for example 0°. Conventional transducer wheels are usually identified as 60-2 or 120-2 increment wheels. With the 60-2 transducer wheel all 360 °:60, and thereby 6° angular region forms an increment pulse. A simplified resolution of the angular distance can be obtained by a controller on the control device, whereby at any angles events such as ignition or injection steps can be performed.

With an electro hydraulic control of gas exchange valves, individual adjustment units are provided on the gas exchange valves, and their control is performed coupled non mechanically to the crank or cam shaft, but instead their control is performed exclusively via a control device. With the switching pulses produced by the control device which are angle-dependent from the crankshaft position, the electrohydraulic adjustor or the electromagnetic adjuster is controlled. It must be guaranteed that the switching pulses are produced at the correct angles. Otherwise in the internal combustion engine collisions can occur between an extended gas exchange valve and a piston which is movable in the upper dead point in the cylinder. In the same way, collisions between two open, oppositely arranged gas exchange valves are possible.

SUMMARY OF THE INVENTION

Accordingly, it is an object of present invention to provide a method of and a device for detection of an angular position of a rotatable machine part, which avoids the disadvantages of the prior art.

More particularly, it is an object of present invention to provide a method of and a device for detection of a rotary position of a transducer wheel in which faulty angular informations resulting from disturbances or failures can be avoided.

In keeping with these objects and with others which will become apparent hereinafter, one feature of present invention resides, briefly stated, in the method in which the position of the transducer wheel is simultaneously detected by an increment transducer and by means of an absolute angle transducer.

The use of two angle information transducers which operate in accordance with different physical principles provides a significance increase of the disturbance prevention of the angle information detection. During a disturbance only one angle transducer or the signal transmission from a transducer can be further processed with the corresponding different information. The individual informations, or in other words the information of only the increment transducer or the information of only the absolute angle transducer, can be plausibilized by performing of a continuity testing.

The difference signal generation and signal transmission increases the reliability and the availability of the angle information detection decisively. Thereby, in extreme critical angle regions adjustment events, such as for example the opening of a gas exchange valve and its closing operate in a reliable manner. The control of the adjusters with gas exchange valves can be reliably performed in this manner within the electrohydraulic valve control or the electromagnetic valve control.

The use of increment transducer as a primary transducer provides on the one hand the detection of a high-actual angle information of the part to be detected, and on the other hand after a certain disturbance requires a new synchronization of the increment transducer. The use of an additional absolute angle transducerdetects after certain disturbance directly again the rotary movement of a transducer wheel, so that a correct angle information is transmitted to the control device without requirements for a new synchronization.

The use of an absolute angle transducer provides in the position of the motor stoppage an inquiry via the angle position of the crankshaft. Thereby during the starting phase, for example all gas shuttle valves on an internal combustion must remain closed, until the increment transducer is synchronized. Thereby a substantially shorter starting phase is obtained with a combustion engine, in which due to the injection which is corrected with respect to the angle position and a cylinder, a faster start is possible. Moreover, the exhaust gas emission is considerably reduced by shortening of the starting phase. Together with a direct injection, a direct start of an internal combustion engine is possible (without a starter).

Furthermore, with the method in accordance with the present invention and the inventive device, a fast recognition of a low rotary speed of the internal combustion engine is provided, so that the electric fuel pumps, ignition and injection pulses are switched off early by the control device. Finally, with the proposed inventive solution, the advantages are provided in an early and reliable recognition of the rotary direction, so that during stalling of the combustion engine the valve control as well as outputting of the ignition and injection signals do not occur.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENT

Figure 1:
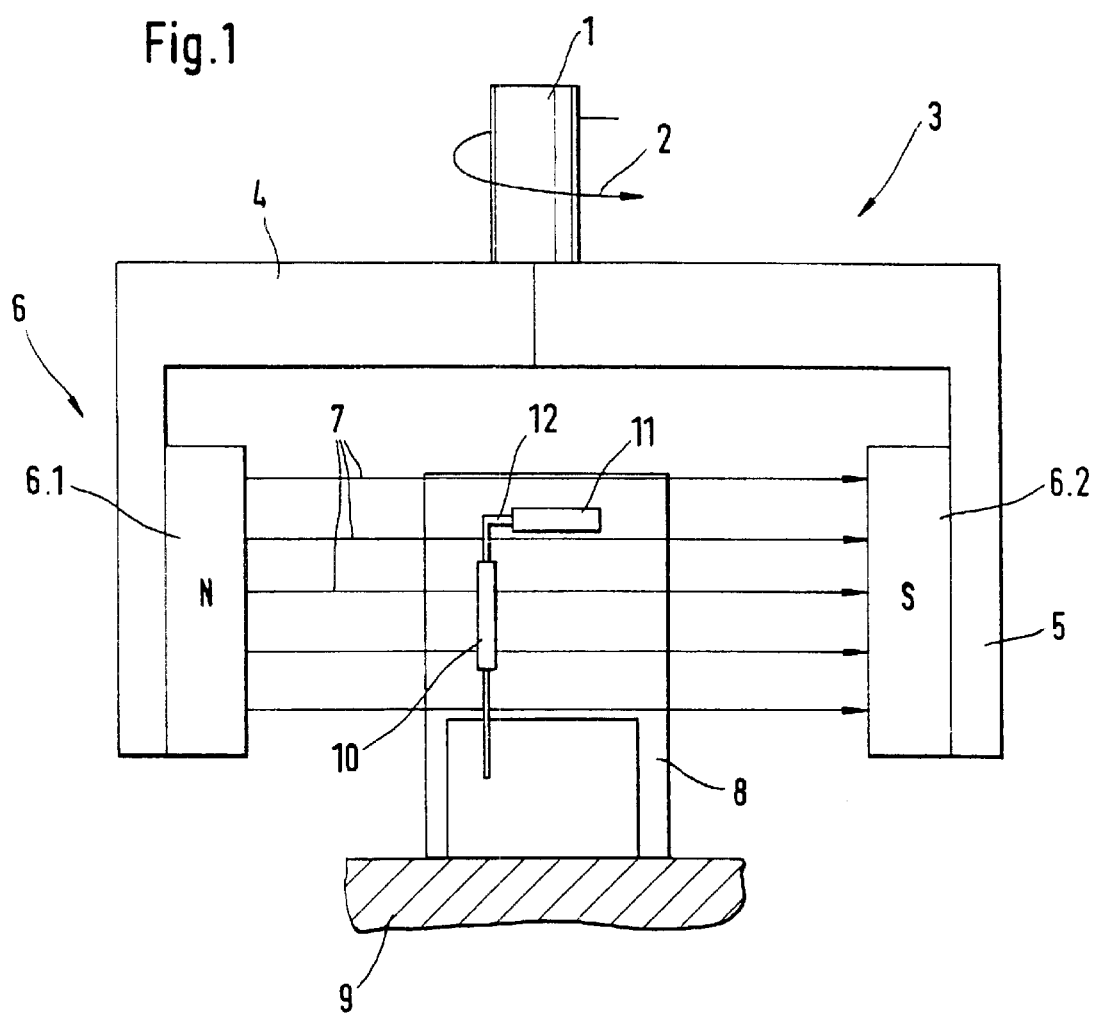
FIG. 1 is a view showing a configuration of an absolute angle transducer in accordance with the present invention.

FIG. 1 shows an enlarged schematic representation of an absolute angle transducer which cooperates with a shaft 1. A cam shaft or a crankshaft which rotates in a rotary direction 2 is received in a supporting structure 3 on the shaft 1. The bottom 4 of the supporting structure 3 is connected with the shaft 1. A magnet 6 is provided on the walls 5 of the supporting structure 3 and includes a first magnet pole 6.1 and a second magnet pole 6.2. A magnet field 7 is formed between the first magnetic pole 6.1 and the second magnet pole 6.2. A rotary angle sensor 8 is located in the magnetic field 7. The rotary angle 8 is arranged in a sensor holder 9.

The rotary angle sensor 8 includes two components which are connected with one another by a conductor 12. In particular, it includes a Hall element 11 which represents a first IC and a further magnetic-resistive component valve which represents a second IC. It is used in the inventive method for avoiding a new synchronization phase required in increment transducers, for detection of the rotary position of the crankshaft before the beginning of the first crankshaft revolution. Thereby an information about the rotary position of the crankshaft is available at the control device 13, and can be further processed.

Figure 2:
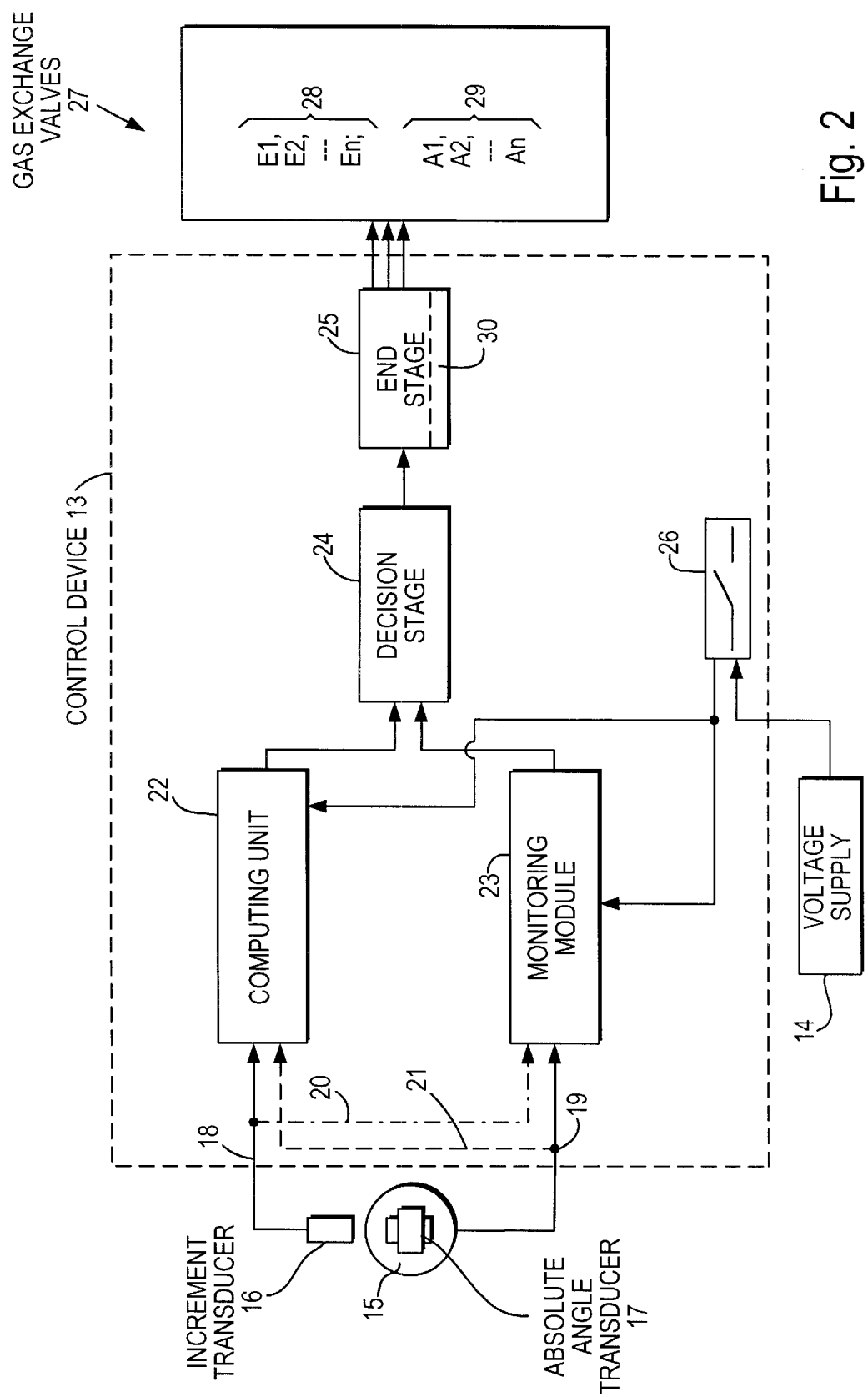
FIG. 2 is a view illustrating a gas shuttle valve control by a control device, with a combined angle detection.

FIG. 2 shows a combined detection of an angle information and its further processing in a control device which controls a gas shuttle valve.

The absolute angle transducer shown in FIG. 1 can be associated with a transducer wheel 15 as an additional absolute angle transducer 17. In addition, a further transducer formed as an increment transducer 16 is associated with the transducer wheel 15. Preferably, the rotary angle transducer 16 is positioned on the periphery of the transducer wheel 15, while the absolute angle transducer 17 is mounted axially.

With the increment position transducer 16 it is advantageous that it makes possible a one-bit transmission during passage of each tooth flank for detection, so that with the passage of one tooth flank a correct change information is available.

A synchronization to the absolute value of the rotary angle, or in other words the crankshaft rotary angle is performed after passage of the known flank. With stepped transmission wheels with 60-2 teeth on the periphery, angle regions of 6° of crankshaft angle are released. In order to obtain a fine angular position, a time extrapolation can be performed with control associated with a control device 13. Thereby events in small angular regions can be placed as the above mentioned 6° angle regions. The increment transducer is used as a primary transducer and provides a high dynamic determination of the corresponding angle information of a part to be detected.

The absolute angle transmission 17 which is mounted axially includes an integrated evaluation unit with which different, quasi continuous output signals are transmitted to the inputs of the control device 13. In addition to an analog transmission signal, a digitalized transmission of an output signal is possible. For this purpose a "Multi-Bit-Signal" (<12 bit) serves in bit-parallel connection, or a serial transmission way. The serial output signal can be subjected to a pulse width modulation, to improve the signal quality and the signal transfer. After certain disturbance, with the use of an absolute angle transducer 17 an angle information about the corresponding part becomes available, so that this information is ready faster than that of the increment transducer 16, on which a tooth gap must be evaluated for new synchronization of the output signal 18.

The control device 13 which operates in accordance with the inventive method includes a computing unit 22 and a monitoring module 23. Their energy supply is performed through the voltage supply 14 and a switch 26. The increment signal 18 is transmitted to the input of the computing unit 22, an increment signal 20 which is branched from the increment signal 18 is further supplied to the monitoring module 23. Analogously, the absolute angle transducer 17 reacts with the absolute angle signal 19, which is supplied to the monitoring module 23. First the signal is branched and is supplied parallel as a branched absolute angle signal 21 to the computing unit 22 in the control device 13.

The angle informations received in the computing unit 22 and the monitoring module 23 are supplied to a decision stage 24 which has 2×n channels, in correspondence with the number of the gas shuttle valves 27 to be controlled. The end stage 25 is acted from there, and again through its channels 30 controls a first group of inlet valves 28 (1 to n) or a second group 29 of outlet valves (1 to n) for gas exchange in the cylinder chambers of the internal combustion engine. The control of the gas exchange valves 27 can be performed with the framework of an electrohydraulic valve control EHVS, as well as within the frame work of electromagnetic valve control EMVS. The adjuster for cylinder control through the end stage 25 is not shown in the drawings.

Due to the parallel evaluation of the sensor informations 18, 19, 20 and 21 in the control device 13 from the increment transducer 16 and the absolute angle transducer 17, in a very simple way an absolute plausibility testing of the signals can be performed. After a certain disturbance, in the absolute angle 17 a correct angle information is available without a time interval required in the increment transducer 17 for the new synchronization. Thereby during a first movement of the crankshaft, the gas exchange valve 27 must not remain closed for synchronization of the increment transducer 16. Since angle informations 19 and 21 are available through the absolute angle transducer 17 the corresponding gas shuttle valve groups 28 and 29 can be controlled in correspondence with the cylinders so that a shorter starting time is provided. Thereby in addition, injection can be performed earlier in the cylinders. Furthermore, a simple rotary speed diagnosis can be performed, and a low rotary speed recognized faster, which can be used for preliminary switching off of the electric fuel pump, the ignition as well as the injection device. Thereby the parts, such as a catalyst can be efficiently protected, and first of all a collision of the valves with one another and with the pistons can be prevented.

Since the increment transducer 16 and the absolute value transducer 17 operate in accordance with different principles, the disturbance sensitivity is substantially reduced by the redundancy of the system. If one transducer fails, an angle information can be transmitted by means of the remaining transducer 16 or 17 and processed further. In addition to the above mentioned opposite plausibility examination of the signals, the individual information can be plausibilized also by a continuity testing.

With the different signal generation and transmission, the reliability and the availability of the angle information is significantly increased. It is moreover possible to control adjustment events in very critical angle regions, such as for example the gas exchange valve opening as well as the gas exchange valve closing. In addition to the use of the inventive method as well as the inventive device for an electro-hydraulic valve control EHVS, also this method can be utilized for electromagnetic valve control EMVS.

It will be understood that each of the elements described above, or two or more together, may also find a useful application in other types of methods and constructions differing from the types described above.

While the invention has been illustrated and described as embodied in method of and device for detecting angular position of a rotatable machine part, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of detecting an angular position of a rotatable part, said method comprising the steps of:
    a) providing a transducer device comprising an increment transducer for detecting incremental angular position, an absolute angle transducer for detecting absolute angular position and a control device connected to said increment transducer and to said absolute angle transducer to receive an increment signal generated by said increment transducer and an absolute signal generated by said absolute angle transducer simultaneously, said control device comprising a computing unit and a monitoring module;
    b) arranging said transducer device so that both of said absolute angle transducer and said increment transducer detect a rotational position of a transducer wheel, said rotatable part comprising said transducer wheel; and
    c) supplying said increment signal and a branched increment signal branched from said increment signal to said computing unit and said monitoring module respectively and, at the same time, supplying said absolute signal and a branched absolute signal branched from said absolute signal to said monitoring module and said computing unit respectively;
    whereby said angular position of said rotatable part is simultaneously detected by both said absolute angle transducer and said increment transducer without the presence of interference or disturbances.

2. The method as defined in claim 1, further comprising mutual plausibility testing of angle information by redundant evaluation of said increment signal and said absolute signal in said control device.

3. The method as defined in claim 1, further comprising immediately providing correct angular position information by means of said absolute angle transducer without a new synchronization of said increment transducer in the event of said disturbances or interference.

4. The method as defined in claim 1, wherein said increment transducer is a rapid dynamic increment transducer including means for detecting tooth flanks formed in said transducer wheel and generating a plurality of flank pulses.

5. The method as defined in claim 4, further comprising dividing said transducer wheel into respective six-degree-wide angular regions corresponding to said flank pulses and performing a time interpolation for time intervals between said flank pulses to accurately trigger events at selected times between said flank pulses.

6. The method as defined in claim 1, wherein the rotatable part is a camshaft or crankshaft of an internal combustion engine and further comprising calculating a rotation speed of said internal combustion engine from a time interval for rotation of the transducer wheel over a predetermined measured angular position interval.

7. The method as defined in claim 1, further comprising digitizing an analog output signal of the absolute angle transducer to form a multi-bit signal for a bit parallel connection.

8. The method as defined in claim 1, further comprising digitizing an analog output signal of the absolute angle transducer to form a digital serial signal for digital serial transmission.

9. The method as defined in claim 8, wherein said digital serial signal is a pulse width modulated signal.

10. A device for detecting an angular position of a rotatable part, said device comprising
    a transducer wheel non-rotatably attached to said rotatable part so as to rotate with said rotatable part;
    transducer means comprising an increment transducer for detecting incremental angular position and an absolute angle transducer for detecting absolute angular position, said transducer means being arranged so that said increment transducer generates an increment signal according to a rotational position of the transducer wheel and said absolute angle transducer generates an absolute signal according to said rotational position of said transducer wheel; and
    a control device connected to said increment transducer and to said absolute angle transducer to receive said increment signal and said absolute signal simultaneously;
    wherein said control device comprises a computing unit and a monitoring module, said computing unit and said monitoring unit are connected to simultaneously receive both said increment signal and said absolute signal and said control device includes means for mutual plausibility testing of said increment signal and said absolute signal.

* * * * *